(12) United States Patent
Sakata

(10) Patent No.: US 12,325,392 B2
(45) Date of Patent: Jun. 10, 2025

(54) BRAKING DEVICE FOR VEHICLE

(71) Applicant: ADVICS CO., LTD., Kariya (JP)

(72) Inventor: Yasunori Sakata, Kariya (JP)

(73) Assignee: ADVICS CO., LTD., Kariya (JP)

( * ) Notice: Subject to any disclaimer, the term of this patent is extended or adjusted under 35 U.S.C. 154(b) by 419 days.

(21) Appl. No.: 17/802,840

(22) PCT Filed: Mar. 26, 2021

(86) PCT No.: PCT/JP2021/012881
§ 371 (c)(1),
(2) Date: Aug. 26, 2022

(87) PCT Pub. No.: WO2021/200663
PCT Pub. Date: Oct. 7, 2021

(65) Prior Publication Data
US 2023/0008163 A1    Jan. 12, 2023

(30) Foreign Application Priority Data

Mar. 31, 2020 (JP) .................................. 2020-063143

(51) Int. Cl.
*B60T 13/74* (2006.01)
*B60T 13/14* (2006.01)
*B60T 13/68* (2006.01)
*B60T 17/18* (2006.01)

(52) U.S. Cl.
CPC .......... *B60T 13/686* (2013.01); *B60T 13/148* (2013.01); *B60T 13/745* (2013.01); *B60T 17/18* (2013.01)

(58) Field of Classification Search
CPC ................. B60T 13/745; B60T 13/686; B60T 2270/402; B60T 2270/403; B60T 13/142
See application file for complete search history.

(56) References Cited

U.S. PATENT DOCUMENTS 9,205,821 B2     12/2015 Biller et al.
9,656,650 B2 *    5/2017 Yamasaki ................. B60T 8/88
10,449,941 B2 *  10/2019 Maki ....................... B60T 8/363
(Continued)

FOREIGN PATENT DOCUMENTS

WO     2012105526 A1     8/2012

OTHER PUBLICATIONS

U.S. Appl. No. 17/802,810, filed Aug. 26, 2022, Kazutoshi Yogo et al.
(Continued)

*Primary Examiner* — Bradley T King
(74) *Attorney, Agent, or Firm* — BUCHANAN INGERSOLL & ROONEY PC

(57) ABSTRACT

A vehicle braking device includes: an electric cylinder in which a piston driven by an electric motor slides in a cylinder to supply fluid; a hydraulic pressure output unit connected to the electric cylinder by way of a first liquid passage, the hydraulic pressure output unit pressurizing or depressurizing a hydraulic pressure in the first liquid passage and outputting the hydraulic pressure to a supply liquid passage connected to a first wheel cylinder; and a control unit that causes at least one of the electric cylinder and the hydraulic pressure output unit to generate the hydraulic pressure in the first wheel cylinder according to a relative position between the piston and the cylinder.

12 Claims, 8 Drawing Sheets

(56) References Cited

U.S. PATENT DOCUMENTS

| | | | | |
|---|---|---|---|---|
| 10,752,228 | B2* | 8/2020 | Peichl | B60T 8/4081 |
| 11,535,218 | B2* | 12/2022 | Lee | B60T 17/221 |
| 11,964,643 | B2* | 4/2024 | Yamamoto | B60T 7/042 |
| 2014/0008965 | A1 | 1/2014 | Ito et al. | |
| 2015/0283987 | A1* | 10/2015 | Bareiss | B60T 8/171 |
| | | | | 701/70 |
| 2017/0320474 | A1* | 11/2017 | Svensson | B60T 17/02 |
| 2018/0118181 | A1* | 5/2018 | Maki | B60T 8/00 |
| 2018/0273007 | A1* | 9/2018 | Ishikawa | B60T 7/042 |
| 2020/0198607 | A1* | 6/2020 | Weitze | B60T 8/4081 |
| 2020/0339086 | A1* | 10/2020 | Grimm | B60T 8/326 |
| 2020/0369248 | A1* | 11/2020 | Marx | B60T 13/686 |
| 2021/0061246 | A1* | 3/2021 | Kim | F16D 61/00 |
| 2021/0078555 | A1* | 3/2021 | Kim | B60T 13/142 |
| 2022/0126806 | A1* | 4/2022 | Leiber | B60T 8/4054 |
| 2024/0278758 | A1* | 8/2024 | Stanojkovski | B60T 17/18 |

OTHER PUBLICATIONS

International Search Report (PCT/ISA/210) with translation and Written Opinion (PCT/ISA/237) mailed on May 25, 2021, by the Japan Patent Office as the International Searching Authority for International Application No. PCT/JP2021/012881. (8 pages).

* cited by examiner

BRAKING DEVICE FOR VEHICLE

TECHNICAL FIELD

The present disclosure relates to a vehicle braking device.

BACKGROUND ART

The brake system disclosed in U.S. Pat. No. 9,205,821 includes an electric cylinder and a pump. The electric cylinder includes a cylinder and a piston slidable in the cylinder. An output chamber is formed in the cylinder. The electric cylinder generates hydraulic pressure by sliding the piston to decrease the volume of the output chamber.

CITATION LIST

Patent Literature

Patent Literature 1: U.S. Pat. No. 9,205,821

SUMMARY

Technical Problems

The hydraulic pressure that can be generated by the electric cylinder depends on the remaining volume of the output chamber. The remaining volume is a volume of the output chamber that increases and decreases according to the sliding of the piston. For example, when the piston is likely to bottom, the hydraulic pressure that can be generated even if the piston is sled so as to further decrease the volume of the output chamber is limited. However, if the output chamber is made large so that the piston does not bottom with respect to any target generated hydraulic pressure, the electric cylinder increases in size.

An object of the present disclosure is to provide a vehicle braking device capable of pressurizing a wheel cylinder without increasing the size of an electric cylinder.

Solutions to Problems

A vehicle braking device according to the present disclosure includes: an electric cylinder in which a piston driven by an electric motor slides in the cylinder to supply fluid; a hydraulic pressure output unit connected to the electric cylinder by way of a first liquid passage, the hydraulic pressure output unit pressurizing or depressurizing a hydraulic pressure in the first liquid passage and outputting the hydraulic pressure to a supply liquid passage connected to a first wheel cylinder; and a control unit that causes at least one of the electric cylinder and the hydraulic pressure output unit to generate the hydraulic pressure in the first wheel cylinder according to a relative position between the piston and the cylinder.

Advantageous Effects

According to the present disclosure, the hydraulic pressure is generated by at least one of the electric cylinder and the hydraulic pressure output unit according to the relative position between the piston and the cylinder, that is, the remaining volume of the output chamber. Thus, for example, when the remaining volume of the output chamber is small, the first wheel cylinder can be pressurized by the hydraulic pressure output unit before the electric cylinder reaches a pressurization upper limit. Therefore, it is not necessary to increase the size of the electric cylinder with increase in the size of the output chamber. According to the present disclosure, a first wheel cylinder can be pressurized without increasing the size of an electric cylinder.

DESCRIPTION OF EMBODIMENTS

Figure 1:
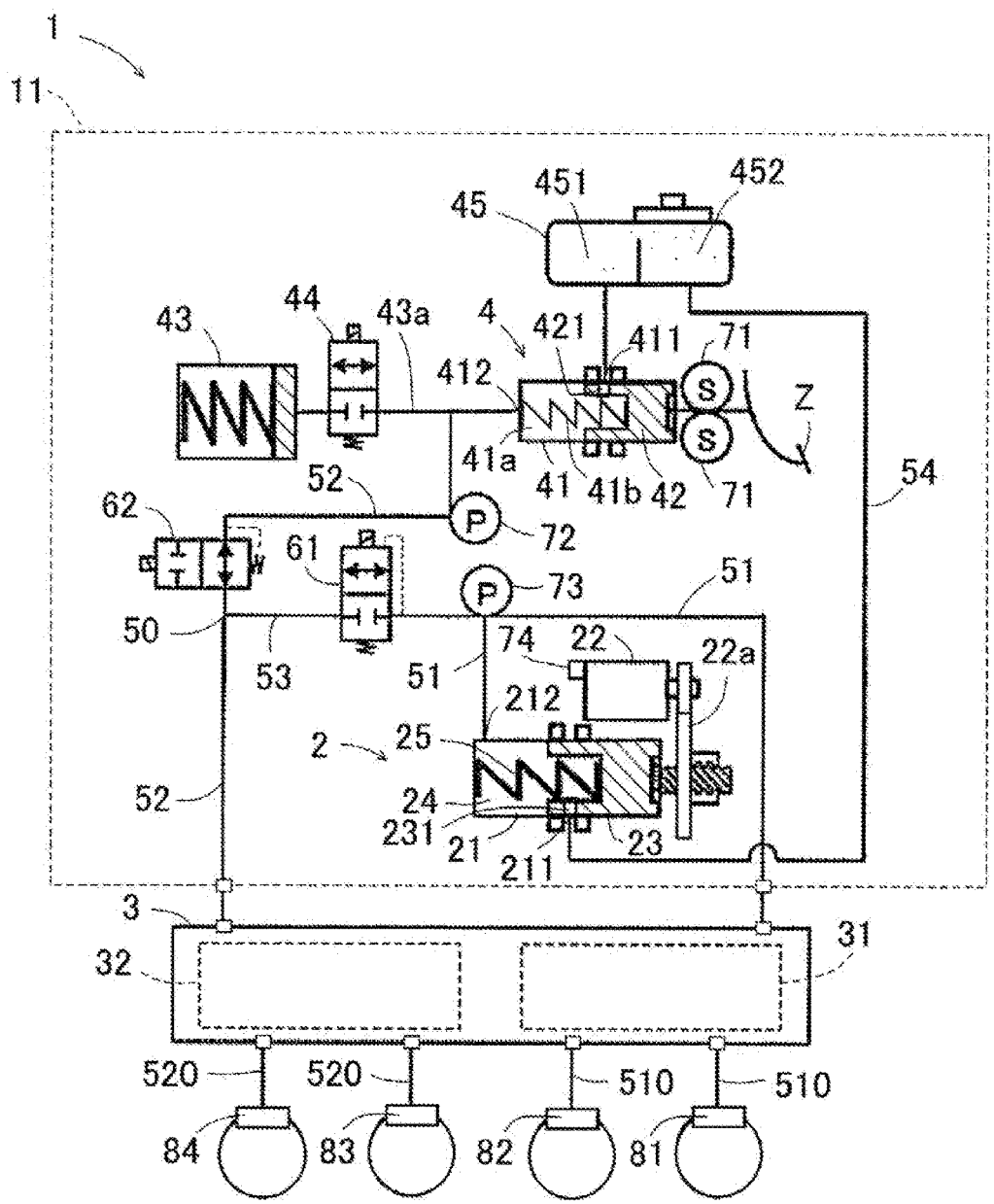
FIG. 1 is a configuration view of a vehicle braking device according to a first embodiment.

Hereinafter, embodiments of the vehicle braking device will be described based on the drawings. In the following embodiments, the same or equivalent portions are denoted with the same reference numerals in the drawings. Each drawing used for description is a conceptual diagram.

First Embodiment

As illustrated in FIG. 1, a vehicle braking device 1 of a first embodiment includes an upstream unit 11, an actuator 3 constituting a downstream unit, a first brake ECU 901, a second brake ECU 902, and a power supply device 903. The upstream unit 11 is configured to be able to supply base hydraulic pressure to the actuator 3.

The upstream unit 11 includes an electric cylinder 2, a master cylinder 4, a first liquid passage 51, a second liquid passage 52, a communication path 53, a brake fluid supply path 54, a communication control valve 61, and a master cut valve 62. The first brake ECU 901 controls at least the upstream unit 11. The second brake ECU 902 controls at least the actuator 3. Note that FIG. 1 illustrates a non-energized state of the vehicle braking device 1.

(Electric Cylinder)

The electric cylinder 2 is a pressurizing unit (pressure adjusting unit) capable of pressurizing first wheel cylinders 81 and 82 and second wheel cylinders 83 and 84. The first wheel cylinders 81 and 82 are first-system wheel cylinders, and the second wheel cylinders 83 and 84 are second-system wheel cylinders. The piping connection is, for example, a front-rear piping in which the first system is disposed with respect to the rear wheel and the second system is disposed with respect to the front wheel. The piping connection may be a cross piping in which the front wheel and the rear wheel are disposed in each of the first system and the second system.

The electric cylinder 2 includes a cylinder 21, an electric motor 22, a piston 23, an output chamber 24, and a biasing member 25. The electric motor 22 is connected to the piston 23 by way of a linear motion mechanism 22a that converts rotational motion into linear motion. The electric cylinder 2 is a single type electric cylinder in which a single output chamber 24 is formed in the cylinder 21.

The piston 23 slides in an axial direction in the cylinder 21 by driving of the electric motor 22. The piston 23 is formed in a bottomed cylindrical shape that is opened on one side in the axial direction and has a bottom surface on the other side in the axial direction. That is, the piston 23 includes a tubular portion forming an opening and a columnar portion forming a bottom surface (pressure receiving surface).

Figure 2:
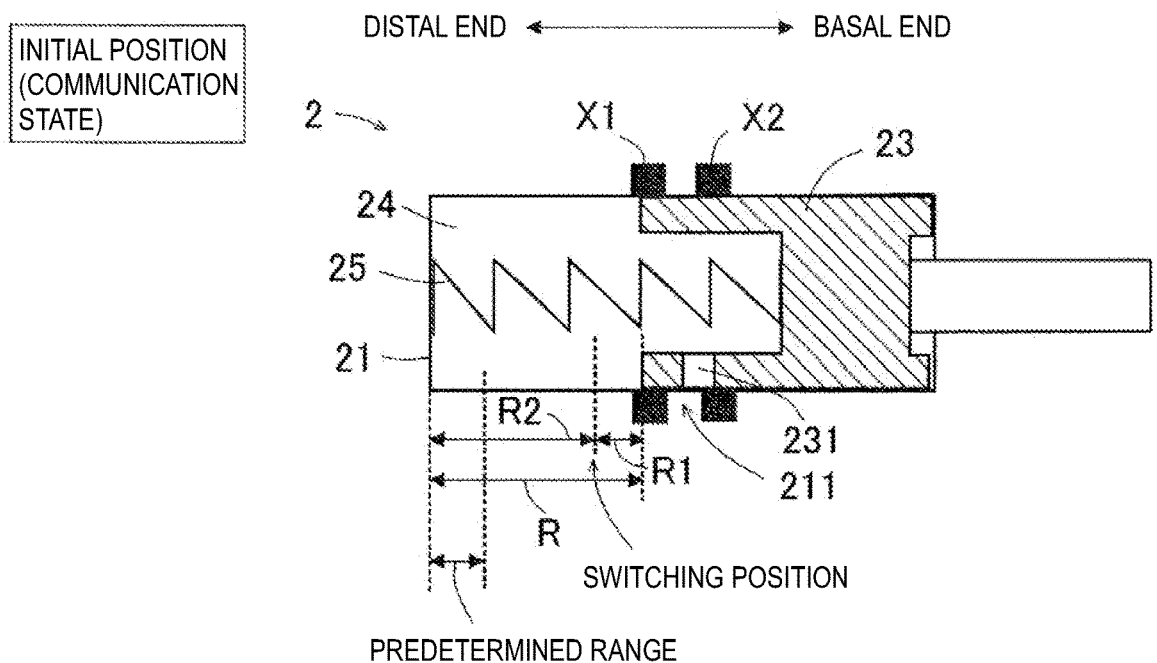
FIG. 2 is a conceptual diagram for explaining an electric cylinder according to the first embodiment.

The output chamber 24 is partitioned by the cylinder 21 and the piston 23, and the volume changes by the movement of the piston 23. The output chamber 24 is connected to a reservoir 45 and the actuator 3. As illustrated in FIG. 2, the piston 23 slides in a sliding region R including a position where the volume of the output chamber 24 is minimized and a position where the volume of the output chamber 24 is maximized in the axial direction. The sliding region R includes a communication region R1 that communicates the output chamber 24 and the reservoir 45 with each other, and a cut-off region R2 that cuts off the output chamber 24 and the reservoir 45 from each other. The communication region R1 includes an initial position of the piston 23 where the volume of the output chamber 24 is maximized. The cut-off region R2 includes a position of the piston 23 where the volume of the output chamber 24 is minimized. The position of the piston 23 where the volume of the output chamber 24 is minimized is also referred to as a bottoming position. The cut-off region R2 is larger than the communication region R1 in the axial direction. Note that in FIG. 2, each of the regions R, R1, and R2 is represented based on the position of one end (distal end) in the axial direction of the piston 23. In the present example, a direction in which the piston 23 decreases the volume of the output chamber 24 from the initial position is also referred to as a distal end direction. A direction in which the piston 23 moves from the bottoming position toward the initial position is also referred to as a basal end direction. Note that the distal end direction and the basal end direction in the present description are directions used merely to facilitate the description, and do not indicate directions on a product.

More specifically, an input port 211 and an output port 212 are formed in the cylinder 21. The output port 212 communicates the output chamber 24 and the first liquid passage 51. The input port 211 overlaps the tubular portion of the piston 23 when the piston 23 is located at the initial position. A through hole 231 is formed in the tubular portion of the piston 23. The through hole 231 is formed at a position (overlapping position) facing the input port 211 when the piston 23 is at the initial position.

In a state where the input port 211 and the through hole 231 are overlapped, the output chamber 24 and the reservoir 45 communicate with each other. As the piston 23 moves in the distal end direction, the amount of overlap between the input port 211 and the through hole 231 decreases. In a state where the input port 211 and the through hole 231 do not overlap, the output chamber 24 and the reservoir 45 are cut off from each other.

The cylinder 21 is provided with seal members X1 and X2 (see FIG. 2). The input port 211 is formed between the seal member X1 and the seal member X2. The seal member X1 on one side in the axial direction is an annular cup seal. Therefore, the seal member X1 prohibits the flow of the fluid from the output chamber 24 to the reservoir 45 and permits the flow of the fluid from the reservoir 45 to the output chamber 24 in a state (cut-off state) where the position of the piston 23 is in the cut-off region R2.

The communication region R1 becomes larger as the overlap amount (the axial length of the through hole 231 and/or the input port 211) becomes larger. In the present embodiment, the input port 211 and the through hole 231 have the same level of axial length. In the movement of the piston 23 in the distal end direction, the communication region R1 continues until the piston 23 moves from the initial position by a predetermined amount (overlap distance). The predetermined amount corresponds to a separation distance between the initial position and the switching position. The biasing member 25 is a spring that is disposed in the output chamber 24 and biases the piston 23 in the basal end direction (toward the initial position).

The communication region R1 is a region between the initial position and the switching position of the piston 23. When the piston 23 moves from the initial position in the distal end direction and reaches the switching position, the overlap between the through hole 231 and the input port 211 is eliminated, and the connection state between the output chamber 24 and the reservoir 45 is switched from the communication state to the cut-off state. That is, it can be said that the electric cylinder 2 is in a hydraulic pressure generation state in which hydraulic pressure is generated in the output chamber 24. On the other hand, when the piston 23 moves in the basal end direction and reaches the switching position in the cut-off state (hydraulic pressure generation state), the through hole 231 and the input port 211 start to overlap with each other, and the connection state is switched from the cut-off state to the communication state. The position of the piston 23 can be said to be a relative position of the piston 23 with respect to the cylinder 21.

<Actuator>

The actuator 3 is a pressure adjusting unit (downstream unit) including a first hydraulic pressure output unit (corresponding to a "hydraulic pressure output unit") 31 configured to be able to adjust the pressures of the first wheel cylinders 81 and 82 and a second hydraulic pressure output unit 32 configured to be able to adjust the pressures of the second wheel cylinders 83 and 84. The actuator 3 is connected to the electric cylinder 2.

The first hydraulic pressure output unit 31 is configured to pressurize the first wheel cylinders 81 and 82 by generating a differential pressure between the input hydraulic pressure and the hydraulic pressure of the first wheel cylinders 81 and 82. Similarly, the second hydraulic pressure output unit 32 is configured to pressurize the second wheel cylinders 83 and 84 by generating a differential pressure between the input hydraulic pressure and the hydraulic pressure of the second wheel cylinders 83 and 84.

The actuator 3 is a so-called ESC actuator, and can independently adjust the hydraulic pressure of each wheel cylinder 81 to 84. The actuator 3 executes, for example, anti-skid control (also referred to as ABS control), side slip prevention control (ESC), traction control, or the like according to the control of the second brake ECU 902. The first hydraulic pressure output unit 31 and the second hydraulic pressure output unit 32 are independent of each other on the hydraulic pressure circuit of the actuator 3. The configuration of the actuator 3 will be described later.

(Master Cylinder)

The master cylinder 4 is connected to the reservoir 45, and mechanically supplies brake fluid to the first hydraulic pressure output unit 31 of the actuator 3 according to the operation amount (stroke and/or depression force) of a brake operation member Z. The master cylinder 4 and the electric cylinder 2 can generate hydraulic pressure independently of each other. The master cylinder 4 is configured to be able to pressurize the wheel cylinders 81 and 82 through the first hydraulic pressure output unit 31. The master cylinder 4 includes a cylinder 41 and a piston 42.

The cylinder 41 is a bottomed cylindrical member. An input port 411 and an output port 412 are formed in the cylinder 41. The piston 42 is a piston member that slides in the cylinder 41 according to the operation amount of the brake operation member Z. The piston 42 is formed to a bottomed cylindrical shape having an opening on the distal end side and a bottom surface on the basal end side.

In the cylinder 41, a single master chamber 41a is formed by the piston 42. In other words, in the master cylinder 4, a master chamber 41a is formed by the cylinder 41 and the piston 42. The volume of the master chamber 41a changes by the movement of the piston 42. When the piston 42 moves to the distal end side, the volume of the master chamber 41a decreases, and the hydraulic pressure (hereinafter referred to as "master pressure") in the master chamber 41a increases. The master chamber 41a is provided with a biasing member 41b that biases the piston 42 toward the initial position. The master cylinder 4 of the present embodiment is a single type master cylinder.

The output port 412 communicates the master chamber 41a and the second liquid passage 52. The input port 411 communicates the master chamber 41a and the reservoir 45 with each other through a through hole 421 formed in a tubular portion of the piston 42. At the initial position of the piston 42 where the volume of the master chamber 41a is maximized, the input port 411 and the through hole 421 overlap, and the master chamber 41a and the reservoir 45 communicate with each other. When the piston 42 moves from the initial position to one side in the axial direction by a predetermined amount (overlap distance), the connection between the master chamber 41a and the reservoir 45 is cut off.

A stroke simulator 43 and a simulator cut valve 44 are connected to the master cylinder 4. The stroke simulator 43 is a device that generates a reaction force (load) with respect to the operation of the brake operation member Z. When the brake operation is released, the piston 42 is returned to the initial position by the biasing member 41b. The stroke simulator 43 includes, for example, a cylinder, a piston, and a biasing member. The stroke simulator 43 and the output port 412 of the cylinder 41 are connected by a liquid passage 43a. The simulator cut valve 44 is a normally closed electromagnetic valve provided in the liquid passage 43a.

(Liquid Passage and Electromagnetic Valve)

The first liquid passage 51 connects the electric cylinder 2 and the first hydraulic pressure output unit 31. The second liquid passage 52 connects the master cylinder 4 (master chamber 41a) and the second hydraulic pressure output unit 32. The communication path 53 connects the first liquid passage 51 and the second liquid passage 52. The supply liquid passage 510 connects the first hydraulic pressure output unit 31 and the first wheel cylinders 81 and 82. The supply liquid passage 520 connects the second hydraulic pressure output unit 32 and the second wheel cylinders 83 and 84.

The communication control valve 61 is a normally closed electromagnetic valve provided in the communication path 53. The communication control valve 61 permits or prohibits the supply of brake fluid to the second hydraulic pressure output unit 32 by the electric cylinder 2. In the communication control valve 61, a valve body is disposed closer to the second wheel cylinders 83 and 84 (second system side) side than a valve seat to prevent backflow of the brake fluid from the second wheel cylinders 83 and 84 to the electric cylinder 2 when the valve is closed. As a result, even if the hydraulic pressure of the second wheel cylinders 83 and 84 becomes higher than the output hydraulic pressure of the electric cylinder 2 when the communication control valve 61 is closed, a force is applied to the valve body in a direction of being pressed against the valve seat (self-sealing), so that the valve is kept closed.

The master cut valve 62 is a normally open type electromagnetic valve provided between a connecting portion 50 of the second liquid passage 52 and the communication path 53 in the second liquid passage 52 and the master cylinder 4. The master cut valve 62 permits or prohibits the supply of brake fluid from the master cylinder 4 to the second hydraulic pressure output unit 32.

The brake fluid supply path 54 connects the reservoir 45 and the input port 211 of the electric cylinder 2. Note that the reservoir 45 stores brake fluid, and the internal pressure is maintained at atmospheric pressure. Furthermore, the inside of the reservoir 45 is partitioned into two rooms 451 and 452, in each of which the brake fluid is stored. The master cylinder 4 is connected to one room 451 of the reservoir 45, and the electric cylinder 2 is connected to the other room 452 via a brake fluid supply path 54. The reservoir 45 may be configured by two separate reservoirs rather than two rooms.

(Configuration Example of Actuator)

Figure 3:
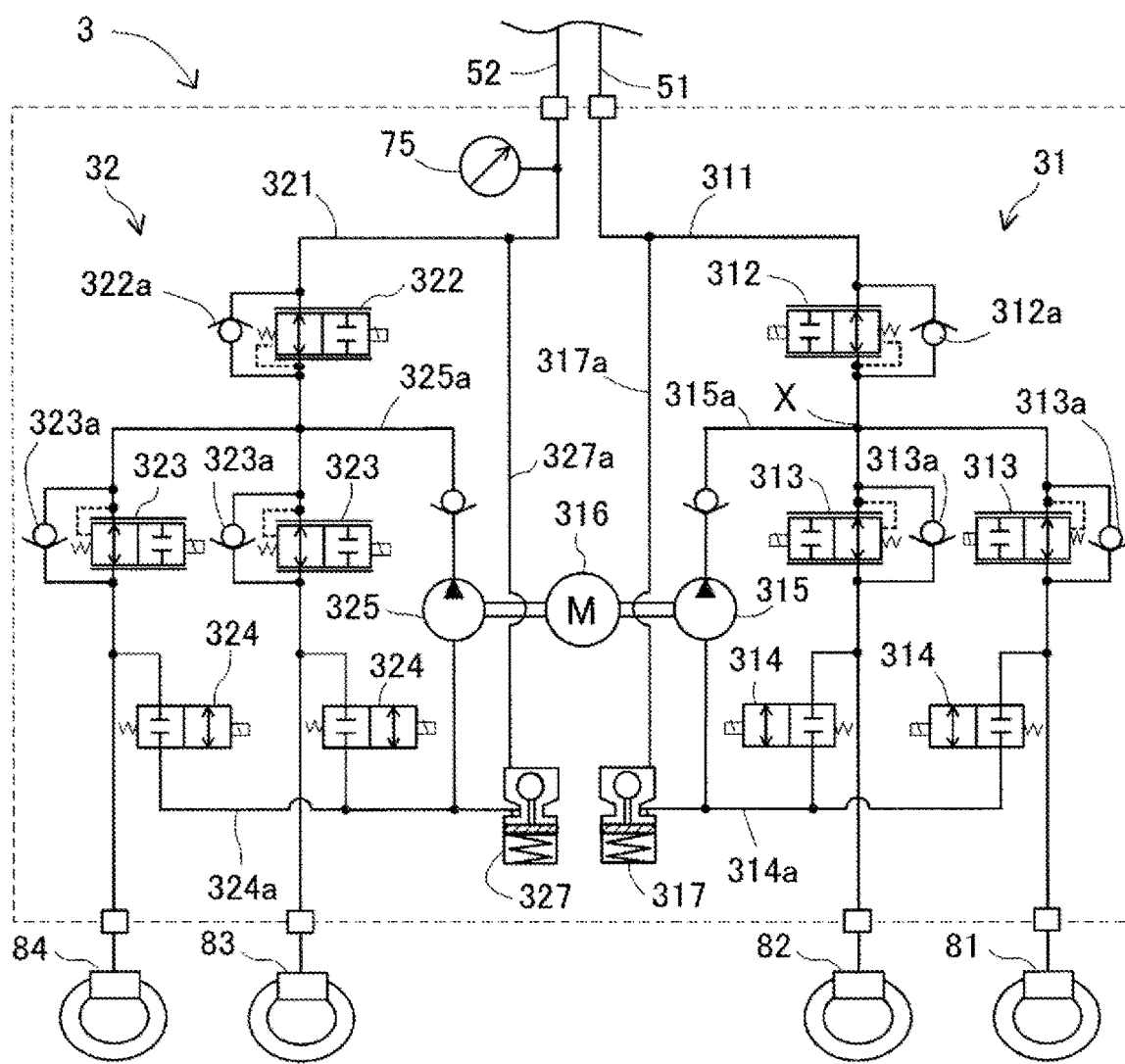
FIG. 3 is a configuration view of an actuator according to the first embodiment.

A configuration example of the actuator 3 will be briefly described using a liquid passage connected to the first wheel cylinder 81 by way of an example. As illustrated in FIG. 3, the first hydraulic pressure output unit 31 of the actuator 3 includes a main liquid passage 311, a differential pressure control valve 312, a holding valve 313, a pressure reducing valve 314, a pump 315, an electric motor 316, and a reservoir 317.

The main liquid passage 311 connects the first liquid passage 51 and the first wheel cylinder 81. The differential pressure control valve 312 is a normally open type linear solenoid valve. A differential pressure can be generated between the upstream and downstream flows by controlling the opening degree of the differential pressure control valve 312 (force toward the valve closing side by the electromagnetic force). A check valve 312a that permits only the flow of the brake fluid from the first liquid passage 51 to the first wheel cylinder 81 is provided in parallel with the differential pressure control valve 312.

The holding valve 313 is a normally open type electromagnetic valve provided between the differential pressure control valve 312 and the first wheel cylinder 81 in the main liquid passage 311. A check valve 313a is provided in parallel with the holding valve 313. The pressure reducing valve 314 is a normally closed electromagnetic valve provided in the pressure reducing liquid passage 314a. The pressure reducing liquid passage 314a connects a portion of the main liquid passage 311 between the holding valve 313 and the first wheel cylinder 81 and the reservoir 317.

The pump 315 is operated by the driving force of the electric motor 316. The pump 315 is provided in a pump liquid passage 315a. The pump liquid passage 315a connects a portion of the main liquid passage 311 between the differential pressure control valve 312 and the holding valve 313 (hereinafter referred to as "branch portion X") and the reservoir 317. When the pump 315 is operated, the brake fluid in the reservoir 317 is discharged to the branch portion X.

The reservoir 317 is a pressure adjusting reservoir. A reflux liquid passage 317a connects the first liquid passage 51 and the reservoir 317. The reservoir 317 is configured such that the brake fluid in the reservoir 317 is preferentially sucked by the operation of the pump 315, the valve is opened when the brake fluid in the reservoir 317 decreases, and the brake fluid is sucked from the first liquid passage 51 through the reflux liquid passage 317a.

When the wheel cylinder 81 is pressurized by the actuator 3, the second brake ECU 902 applies a control current corresponding to the target differential pressure (hydraulic pressure of the wheel cylinder 81>hydraulic pressure of the first liquid passage 51) to the differential pressure control valve 312, and closes the differential pressure control valve 312. At this time, the holding valve 313 is opened, and the pressure reducing valve 314 is closed. When the pump 315 is operated, the brake fluid is supplied from the first liquid passage 51 to the branch portion X through the reservoir 317. As a result, the wheel cylinder 81 is pressurized.

When the difference between the hydraulic pressure of the first wheel cylinder 81 (hereinafter referred to as "first wheel pressure") and the hydraulic pressure of the first liquid passage 51 attempts to increase above the target differential pressure, the differential pressure control valve 312 is opened from the magnitude relationship of the force. The first wheel pressure after pressurization is the sum of the hydraulic pressure in the first liquid passage 51 and the target differential pressure. In this manner, the actuator 3 pressurizes the first wheel cylinder 81 by generating a differential pressure between the output hydraulic pressure of the electric cylinder 2 and the first wheel pressure. The same applies to pressurization of the other wheel cylinders 82, 83, and 84.

When the first wheel pressure is reduced by the actuator 3 by the anti-skid control or the like, the second brake ECU 902 operates the pump 315 in a state where the pressure reducing valve 314 is opened and the holding valve 313 is closed to pump back the brake fluid in the first wheel cylinder 81. When the first wheel pressure is held by the actuator 3, the second brake ECU 902 closes the holding valve 313 and the pressure reducing valve 314. When the first wheel pressure is pressurized or depressurized only by the operation of the electric cylinder 2 or the master cylinder 4, the second brake ECU 902 opens the differential pressure control valve 312 and the holding valve 313 and closes the pressure reducing valve 314.

As described above, the first hydraulic pressure output unit 31 includes a main liquid passage 311 that connects the first liquid passage 51 and the first wheel cylinders 81 and 82, a pump 315 that supplies fluid to the main liquid passage 311 via the pump liquid passage 315a, a differential pressure control valve 312 that is an electromagnetic valve provided between the first liquid passage 51 and the connecting portion (X) between the main liquid passage 311 and the pump liquid passage 315a in the main liquid passage 311, and a check valve 312a that is connected in parallel with the differential pressure control valve 312 and permits only flow of fluid from the electric cylinder 2 to the first wheel cylinders 81 and 82.

Since the configuration of the second hydraulic pressure output unit 32 is the same as that of the first hydraulic pressure output unit 31, the description thereof will be omitted. The main liquid passage 321 of the second hydraulic pressure output unit 32 corresponding to the main liquid passage 311 of the first hydraulic pressure output unit 31 connects the second liquid passage 52 and the second wheel cylinders 83 and 84. A pressure sensor 75 is installed in the main liquid passage 321. As described above, the second hydraulic pressure output unit 32 includes a main liquid passage 321 corresponding to the main liquid passage 311, a differential pressure control valve 322 corresponding to the differential pressure control valve 312, a check valve 322a corresponding to the check valve 312a, a holding valve 323 corresponding to the holding valve 313, a check valve 323a corresponding to the check valve 313a, a pressure reducing valve 324 corresponding to the pressure reducing valve 314, a pump 325 corresponding to the pump 315, and a reservoir 327 corresponding to the reservoir 317. The actuator 3 is configured to be able to pressurize the wheel cylinders 81 to 84 independently of the electric cylinder 2. In the following description, the hydraulic pressure of the wheel cylinders 81 to 84 is also referred to as a wheel pressure.

(Brake ECU and Various Sensors)

The first brake ECU 901 and the second brake ECU 902 (hereinafter, also referred to as "Brake ECUs 901, 902") are electronic control units each including a CPU and a memory. Each of the brake ECUs 901 and 902 includes one or a plurality of processors that execute various controls. The first brake ECU 901 and the second brake ECU 902 are separate ECUs, and are connected to each other so as to be able to communicate information (control information etc.).

The first brake ECU 901 is controllably connected to the electric cylinder 2 and the electromagnetic valves 61, 62, and 44. The second brake ECU 902 is controllably connected to the actuator 3. Each of the brake ECUs 901 and 902 execute various controls based on detection results of the various sensors. As various sensors, the vehicle braking device 1 is provided with, for example, a stroke sensor 71, pressure sensors 72, 73, and 75, a rotation angle sensor 74, a wheel speed sensor (not illustrated), a yaw rate sensor (not illustrated), an acceleration sensor (not illustrated), and the like.

The stroke sensor 71 detects a stroke of the brake operation member Z. The vehicle braking device 1 is provided with two stroke sensors 71 so as to correspond to the brake ECUs 901 and 902 on a one-to-one basis. The brake ECUs 901 and 902 acquire stroke information from the corresponding stroke sensors 71, respectively. The pressure sensor 72 is a sensor that detects the master pressure, and is provided, for example, in a portion of the second liquid passage 52 closer to the master cylinder 4 side than the master cut valve 62. The pressure sensor 73 is a sensor that detects the output hydraulic pressure of the electric cylinder 2, that is, the pressure of the output chamber 24, and is provided, for example, in the second liquid passage 52. The rotation angle sensor 74 is provided with respect to the electric motor 22 of the electric cylinder 2, and detects a rotation angle (rotation position) of the electric motor 22. The pressure sensor 75 detects an input hydraulic pressure from the second liquid passage 52 to the second hydraulic pressure output unit 32. Detection values of the various sensors may be transmitted to both brake ECUs 901 and 902.

The first brake ECU 901 receives the detection results of the stroke sensor 71, the pressure sensors 72 and 73, and the rotation angle sensor 74, and controls the electric cylinder 2 and the electromagnetic valves 61, 62, and 44 based on the detection results. The first brake ECU 901 can calculate each wheel pressure based on the detection results of the pressure sensors 72 and 73 and the control state of the actuator 3.

The second brake ECU 902 receives the detection results of the stroke sensor 71 and the pressure sensor 75, and controls the actuator 3 based on the detection results. The second brake ECU 902 can calculate each wheel pressure based on the control states of the pressure sensor 75 and the actuator 3. The second brake ECU 902 sets a first target differential pressure, which is a target value of the first differential pressure (differential pressure between input pressure and hydraulic pressure of wheel cylinders 81, 82), and a second target differential pressure, which is a target value of the second differential pressure (differential pressure between the input pressure and the hydraulic pressure of the wheel cylinders 83, 84).

The power supply device 903 is a device that supplies power to the brake ECUs 901 and 902. The power supply device 903 includes a battery. The power supply device 903 is connected to both the brake ECUs 901 and 902. That is, in the present embodiment, power is supplied from the power supply device 903 common to the two brake ECUs 901 and 902. Note that the first brake ECU 901 can control the actuator 3 by instructing the second brake ECU 902.

(Control According to Relative Position Between Piston and Cylinder)

The first brake ECU 901 includes a control unit 91. The control unit 91 causes at least one of the electric cylinder 2 and the first hydraulic pressure output unit 31 to generate hydraulic pressure in the wheel cylinders 81 to 84 according to the relative position between the piston 23 and the cylinder 21 of the electric cylinder 2. In other words, in executing the pressurization control for pressurizing the wheel cylinder 81 to 84, the control unit 91 selects at least one of the electric cylinder 2 and the first hydraulic pressure output unit 31 as a drive target according to the position of the piston 23, and pressurizes the wheel cylinder 81 to 84 by the selected drive target.

For example, when the remaining volume of the output chamber 24 of the electric cylinder 2 is small, the wheel cylinders 81 to 84 can be pressurized by the hydraulic pressure output units 31 and 32 before the electric cylinder 2 reaches the pressurization upper limit. The remaining volume corresponds to the volume of the output chamber 24 left before the piston 23 bottoms. Therefore, the remaining volume is maximized when the piston 23 is located at the initial position and minimized when it is located at the bottoming position. The pressurization upper limit is the upper limit of the hydraulic pressure that can be output when the piston 23 of the electric cylinder 2 moves from the initial position to the bottoming position. Since it is possible to suppress an increase in size of the output chamber 24, it is not necessary to increase the size of the electric cylinder 2. According to the first embodiment, the wheel cylinders 81 to 84 can be pressurized without increasing the size of the electric cylinder 2. Note that the remaining volume of the output chamber 24 decreases as the piston 23 moves in the distal end direction. The remaining volume of the output chamber 24 can be said to be a reducible volume of the output chamber 24.

Specific Example

In the pressurization control, when the piston 23 is located outside a predetermined range, the control unit 91 pressurizes the wheel cylinders 81 to 84 with at least the electric cylinder 2. The predetermined range is a range including the position where the piston 23 bottoms and not including the initial position. As illustrated in FIG. 2, the predetermined range is a range extending in the basal end direction from the distal end of the cylinder 21. The control unit 91 sets the drive target according to whether or not the distal end of the piston 23 is within a predetermined range. As described later, the distal end position of the piston 23 is acquired by a rotation angle sensor 74 or the like. In the pressurization control, when the piston 23 is located within a predetermined range, the control unit 91 pressurizes the wheel cylinders 81 to 84 by the hydraulic pressure output units 31 and 32 while maintaining the output hydraulic pressure of the electric cylinder 2. In the pressurization control, it can be said that the control unit 91 executes an upstream priority control (normal control) when the piston 23 is located outside the predetermined range, and executes a downstream priority control when the piston 23 is located within the predetermined range.

In the downstream priority control, the control unit 91 maintains the output hydraulic pressure of the electric cylinder 2 by maintaining the position of the piston 23. Even when the actuator 3 and the reservoir 45 are cut off by the electric cylinder 2, the fluid in the reservoir 45 is sucked into the actuator 3 via the seal member X1 of the electric cylinder 2 by driving the pumps 315 and 325 of the actuator 3. That is, the actuator 3 can pressurize the wheel cylinders 81 to 84 even when the piston 23 is located in the cut-off region R2.

The control unit 91 calculates the position (position information) of the piston 23 based on the detection value of the rotation angle sensor 74. The control unit 91 calculates (estimates) the position of the piston 23 from, for example, the detection value of the rotation angle sensor 74 and the gear ratio of the linear motion mechanism 22a. There is a correlation between the rotation angle (rotation position) of the electric motor 22 and the position of the piston 23. The brake ECUs 901 and 902 may store the correlation.

As illustrated in FIG. 2, the predetermined range is set to a range from the position of the piston 23 where the ratio of the remaining volume of the output chamber 24 with respect to the maximum volume becomes a predetermined ratio (e.g., about 20%) to the position where the piston 23 bottoms. In the present embodiment, the diameter of the cylinder is substantially constant in the axial direction. Therefore, the predetermined range is a range extending from the position where the piston 23 bottoms toward the basal end direction by about 20% of the entire range in the entire range in which the piston 23 can slide. That is, in the pressurization control, when the ratio of the remaining volume of the output chamber 24 with respect to the maximum volume (hereinafter referred to as "remaining ratio") is higher than a predetermined ratio, the control unit 91 pressurizes the wheel cylinders 81 to 84 with at least the electric cylinder 2. In addition, in the pressurization control, when the remaining ratio of the output chamber 24 is less than or equal to a predetermined ratio, the control unit 91 pressurizes the wheel cylinders 81 to 84 by the hydraulic pressure output units 31 and 32 while maintaining the output hydraulic pressure of the electric cylinder 2.

In other words, it can also be said that the control unit 91 executes the upstream priority control when the remaining volume of the output chamber 24 is larger than the threshold value, and executes the downstream priority control when the remaining volume of the output chamber 24 is less than or equal to the threshold value. There is a correlation between the position of the piston 23 and the remaining volume of the output chamber 24. The brake ECUs 901 and 902 may store the correlation.

According to this configuration, when the remaining volume of the output chamber 24 is small, the wheel cylinders 81 to 84 can be pressurized by the actuator 3 while maintaining the position of the piston 23 of the electric cylinder 2. In the downstream priority control, the actuator 3 may pressurize the piston 23 while returning it to the initial position without maintaining the output hydraulic pressure of the electric cylinder 2. However, in this case, the output hydraulic pressure of the electric cylinder 2 can be reduced by moving the piston 23 in the basal end direction. Therefore, it is preferable to execute the control in consideration of the pressure reduction. In the present example described above, since the output pressure of the electric cylinder 2 is maintained, the wheel cylinders 81 to 84 can be suppressed from being pressure reduced.

An example of setting the predetermined ratio will be described. For example, the predetermined ratio can be set to 20%. The predetermined ratio may be set based on the time required from the activation of the actuator 3 to the operation (stable operation). Even if an instruction to switch the pressurization source from the electric cylinder 2 to the actuator 3 is issued when the remaining ratio is 20%, the piston 23 of the electric cylinder 2 can continuously move in the distal end direction to achieve the target pressure during the time until the actuator 3 stably operates (corresponding to the time when the remaining volume becomes a minimum value from 20%).

The number of drive target selection patterns may be three or more. For example, when the remaining ratio of the output chamber 24 is 50 to 100%, the control unit 91 executes pressurization (normal control) by the electric cylinder 2. In addition, when the remaining ratio of the output chamber 24 is 20 to 50%, the control unit 91 executes pressurization by the electric cylinder 2 until the remaining ratio reaches a threshold ratio (e.g., around 20%), and activates and operates the actuator 3 while operating the electric cylinder 2 when the remaining ratio reaches the threshold ratio. When the ratio is the minimum value to 20%, the control unit 91 executes pressurization by the actuator 3. As described above, the control unit 91 can select an appropriate drive target according to the position of the piston 23.

(Control at Time of Sudden Brake)

When the increase gradient of the target braking force is larger than or equal to a predetermined gradient, the control unit 91 pressurizes the wheel cylinders 81 to 84 with the electric cylinder 2 and the hydraulic pressure output units 31 and 32 regardless of the position of the piston 23. The control unit 91 sets the target braking force based on, for example, the operation amount of the brake operation member Z or the command value in the automatic brake control. When the increase gradient of the target braking force is large, that is, at the time of sudden brake, the control unit 91 drives both pressurizing devices (the electric cylinder 2 and the actuator 3) to pressurize the wheel cylinders 81 to 84 instead of the priority control by the position of the piston 23. Thus, the responsiveness of the braking force at the time of sudden brake can be improved.

(Power Saving Control)

The first brake ECU 901 further includes a power saving determination unit 92. The power saving determination unit 92 determines whether or not to suppress the supply power to the electric cylinder 2. The power saving determination unit 92 grasps the charge amount of the battery that supplies power to the electric cylinder 2, and determines to suppress the supply power to the electric cylinder 2 when the charge amount becomes less than or equal to the threshold value.

In the pressurization control, when the power saving determination unit 92 determines to suppress the supply power and the braking force applied to the vehicle is larger than or equal to the predetermined braking force, the control unit 91 maintains the output hydraulic pressure of the electric cylinder 2 regardless of the position of the piston 23 (power saving control). In a state where the braking force is sufficiently applied to the vehicle, there is no problem even if the output hydraulic pressure is maintained by maintaining the position of the piston 23 of the electric cylinder 2. Power consumption can be suppressed by not moving the piston 23. When the braking force is larger than or equal to the predetermined braking force, this corresponds to the fact that the wheel pressure is larger than or equal to a predetermined pressure (necessary braking pressure).

This power saving control is released, for example, at the time of sudden brake or at the time of operation of the AEB (collision damage reduction brake). That is, the priority of the execution of the power saving control is lower than that of the control with high urgency. Furthermore, when the battery is sufficiently charged, the power saving control is released.

(Liquid Leakage Determination Control)

The first brake ECU 901 further includes a liquid leakage determination unit 93, a position acquisition unit 94, and a hydraulic pressure acquisition unit 95. The liquid leakage determination unit 93 determines whether or not liquid leakage has occurred in the second liquid passage 52. The position acquisition unit 94 acquires the position (position information) of the piston 23 based on the detection value of the rotation angle sensor 74. The hydraulic pressure acquisition unit 95 acquires the output hydraulic pressure of the electric cylinder 2 based on the detection value of the pressure sensor 73.

As the first liquid leakage determination control, the liquid leakage determination unit 93 determines whether or not liquid leakage has occurred based on the position of the piston 23 acquired by the position acquisition unit 94 and the output hydraulic pressure of the electric cylinder 2 acquired by the hydraulic pressure acquisition unit 95. There is a correlation between the position of the piston 23 and the output hydraulic pressure of the electric cylinder 2. As the piston 23 moves in the distal end direction, the output hydraulic pressure of the electric cylinder 2 increases. The presence or absence of liquid leakage can be determined by comparing this correlation and the relationship between the actual position of the piston 23 and the output hydraulic pressure of the electric cylinder 2. When the actual output hydraulic pressure of the electric cylinder 2 acquired by the hydraulic pressure acquisition unit 95 is lower than the output hydraulic pressure (assumed pressure) of the electric cylinder 2 assumed from a preset correlation with respect to the actual position of the piston 23 acquired by the position acquisition unit 94 by larger than or equal to a predetermined value, determination can be made that liquid leakage has occurred.

When determining that liquid leakage has occurred in the first liquid leakage determination control, the liquid leakage determination unit 93 closes the differential pressure control valves 312 and 322 and holds the wheel pressure as the second liquid leakage determination control. In this state, the liquid leakage determination unit 93 determines that liquid leakage has occurred in the second liquid passage 52 when the detection value of the pressure sensor 75 is decreased, and determines that liquid leakage has occurred in the first liquid passage 51 when the detection value of the pressure sensor 75 is not decreased.

The liquid leakage determination unit 93 executes the first liquid leakage determination control at a predetermined timing, for example, when the brake operation member Z is depressed or when a predetermined time has elapsed from the previous first liquid leakage determination control. The liquid leakage may occur, for example, at a portion connecting the upstream unit 11 and the actuator 3 or a portion connecting the actuator 3 and the wheel cylinder 81 to 84 in the first liquid passage 51 and the second liquid passage 52. The liquid leakage determination method is not limited to the above. For example, the liquid leakage determination unit 93 may determine that liquid leakage has occurred when a state in which the difference between the target wheel pressure and the actual wheel pressure is larger than or equal to a predetermined value continues for a predetermined time.
(Control at Time of Occurrence of Liquid Leakage)

When the liquid leakage determination unit 93 determines that liquid leakage has occurred in the second liquid passage 52, the control unit 91 closes the communication control valve 61 and causes at least one of the electric cylinder 2 and the first hydraulic pressure output unit 31 to generate hydraulic pressure in the first wheel cylinders 81 and 82 according to the position of the piston 23 of when determined that liquid leakage has occurred.

When the communication control valve 61 is closed, the connection between the first liquid passage 51 (first system) and the second liquid passage 52 (second system) is hydraulically cut off. As a result, the second liquid passage 52 in which the liquid leakage has occurred and the normal first liquid passage 51 are separated. The fluid can be prevented from leaking from the normal first liquid passage 51. In this state, the control unit 91 selects a drive target according to the position of the piston 23 at the time of detecting the occurrence of liquid leakage, and pressurizes the first wheel cylinders 81 and 82 by the drive target. The first wheel cylinders 81 and 82 are thereby normally pressurized.

When the liquid leakage determination unit 93 determines that liquid leakage has occurred in the second liquid passage 52, the control unit 91 causes at least one of the electric cylinder 2 and the first hydraulic pressure output unit 31 to generate hydraulic pressure in the first wheel cylinders 81 and 82 in a state where the master cut valve 62 is closed. This makes it possible to pressurize the first wheel cylinders 81 and 82 while continuing the by-wire mode even at the time of occurrence of liquid leakage.

The by-wire mode is a mode in which the master cylinder 4 and the wheel cylinder 81 to 84 are hydraulically separated and the wheel pressure is adjusted by the control of each brake ECU 901 and 902. In the by-wire mode, the simulator cut valve 44 is in the open state and the master cylinder 4 and the stroke simulator 43 communicate with each other, and hence the brake feeling of the driver is good (as usual). Therefore, according to this configuration, even when liquid leakage is occurring in the second liquid passage 52, the first wheel cylinders 81 and 82 can be pressurized without impairing the brake feeling. Hereinafter, the control when the second liquid passage 52 is in the liquid leakage state is referred to as "second liquid leakage control".

On the other hand, when the liquid leakage determination unit 93 determines that liquid leakage has occurred in the first liquid passage 51, the control unit 91 closes the communication control valve 61 and the simulator cut valve 44 and opens the master cut valve 62. In this state, the control unit 91 controls the second hydraulic pressure output unit 32 using the master pressure supplied from the master cylinder 4 to the second hydraulic pressure output unit 32 as the base hydraulic pressure to pressurize the second wheel cylinders 83 and 84. Hereinafter, the control when the first liquid passage 51 is in the liquid leakage state is referred to as "first liquid leakage control".
(Movement Suppression Control)

Upon executing the first liquid leakage determination control, the liquid leakage determination unit 93 executes a movement suppression control for making the moving speed of the piston 23 lower than the normal moving speed. The normal moving speed is a speed set based on the difference between the target pressure and the actual pressure of the wheel cylinder 81 to 84. The moving speed of the piston 23 is controlled by the rotation number control of the electric motor 22.

In this manner, the liquid leakage determination unit 93 suppresses the moving speed of the piston 23 in the first liquid leakage determination control. A decrease in the remaining volume of the output chamber 24 is suppressed, and outflow of the fluid to the outside when liquid leakage occurs is suppressed by executing the movement suppression control in the first liquid leakage determination control. According to this configuration, the presence or absence of liquid leakage can be determined before the piston 23 bottoms. In addition, the remaining volume of the electric cylinder 2 can be secured as compared with a case where the moving speed is not suppressed.

The liquid leakage determination unit 93 closes the differential pressure control valves 312 and 322 when executing the first liquid leakage determination control. As a result, even when the movement suppression control is executed and the increase gradient of the output hydraulic pressure is decreased, the wheel pressure is held at least at the hydraulic pressure when the valve is closed. That is, the decrease in the braking force at the time of the first liquid leakage determination control is suppressed. When liquid leakage is not occurring in any of the liquid passages, the output hydraulic pressure of the electric cylinder 2 is supplied to the wheel cylinder 81 to 84 via the check valves 312a and 322a.
(Flow of Control Related to Liquid Leakage)

Figure 4:
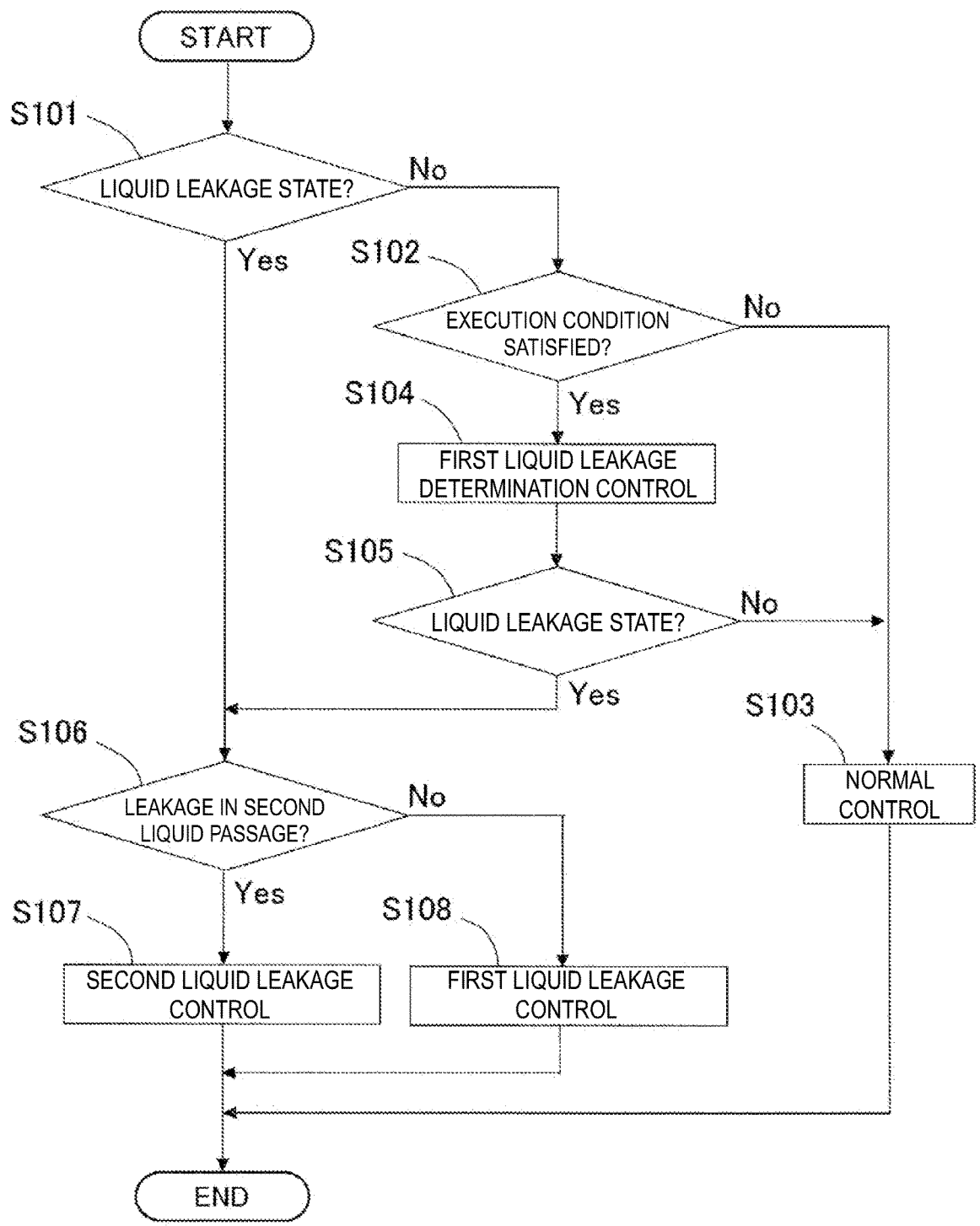
FIG. 4 is a flowchart showing a control example according to the first embodiment.

A flow of control of the first embodiment will be described with reference to FIG. 4. When the vehicle braking device 1 is not in the liquid leakage state (S101: No), the liquid leakage determination unit 93 determines whether or not the execution condition of the first liquid leakage determination control is satisfied (S102). As described above, the execution condition is, for example, that the brake operation has started or that a predetermined time has elapsed from the previous first liquid leakage determination control. When the execution condition is not satisfied (S102: No), the normal control is executed (S103).

In the normal control, the communication control valve 61 and the simulator cut valve 44 are opened, the master cut valve 62 is closed, and the drive target is selected according to the position of the piston 23. The control unit 91 may be configured to select the drive target according to the position of the piston 23 only at the time of occurrence of liquid leakage. That is, the control unit 91 may constantly adjust the wheel pressure mainly by the electric cylinder 2 at the time of the normal control.

When the execution condition is satisfied (S102: Yes), the liquid leakage determination unit 93 executes the first liquid leakage determination control (S104). Upon executing the first liquid leakage determination control, the liquid leakage determination unit 93 closes the differential pressure control valves 312 and 322 and executes the movement suppression control. When the liquid leakage determination unit 93 determines that liquid leakage has no occurred (S105: No), the control unit 91 executes the normal control (S103).

When determining that the liquid leakage has occurred (S105: Yes), the liquid leakage determination unit 93 executes the second liquid leakage determination control to determine whether or not the liquid leakage has occurred in the second liquid passage 52 (S106). When the liquid leakage determination unit 93 determines that liquid leakage has occurred in the second liquid passage 52 (S106: Yes), the control unit 91 executes the second liquid leakage control (S107). When the liquid leakage determination unit 93 determines that liquid leakage has occurred in the first liquid passage 51 (S106: No), the control unit 91 executes the first liquid leakage control (S108).

Figure 5:
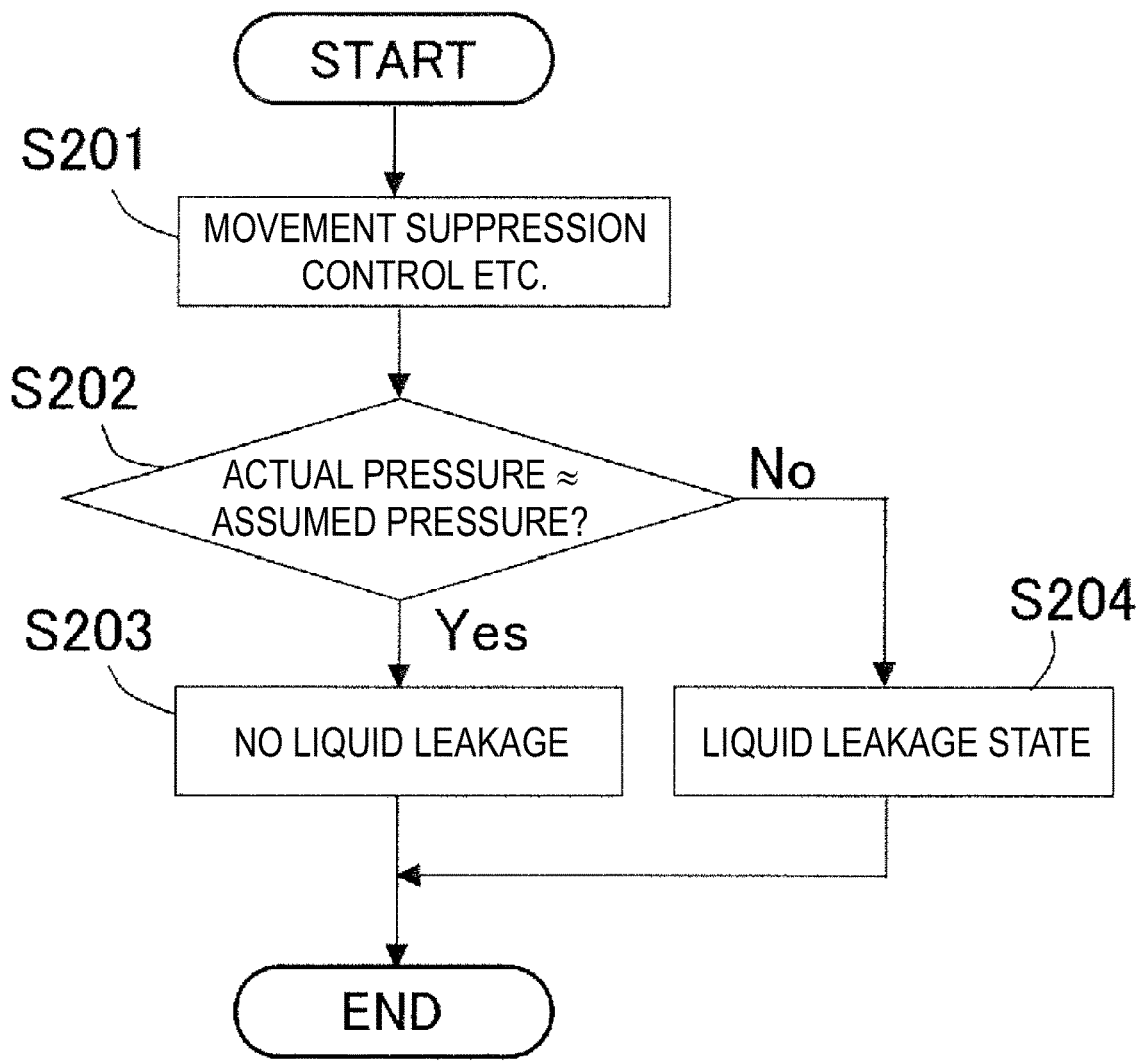
FIG. 5 is a flowchart showing a control example according to the first embodiment.

The flow of the first liquid leakage determination control (S104) will be described with reference to FIG. 5. The liquid leakage determination unit 93 closes the differential pressure control valves 312 and 322 in a state where the communication control valve 61 is opened and the master cut valve 62 is closed, and moves the piston 23 in the distal end direction by the movement suppression control (S201). The liquid leakage determination unit 93 determines whether or not liquid leakage has occurred from the relationship between the position of the piston 23 of the electric cylinder 2 and the output hydraulic pressure of the electric cylinder 2 (S202). When the difference between the output hydraulic pressure (assumed pressure) assumed by the position of the piston 23 and the actual output hydraulic pressure (actual pressure) is less than or equal to the predetermined value (actual pressure≈assumed pressure) (S202: No), the liquid leakage determination unit 93 determines that no liquid leakage has occurred (S203). When the output hydraulic pressure assumed by the position of the piston 23 is higher than the actual output hydraulic pressure and a difference between the two is larger than a predetermined value (actual pressure+predetermined value<assumed pressure) (S202: No), the liquid leakage determination unit 93 determines that liquid leakage has occurred (S204).

Figure 6:
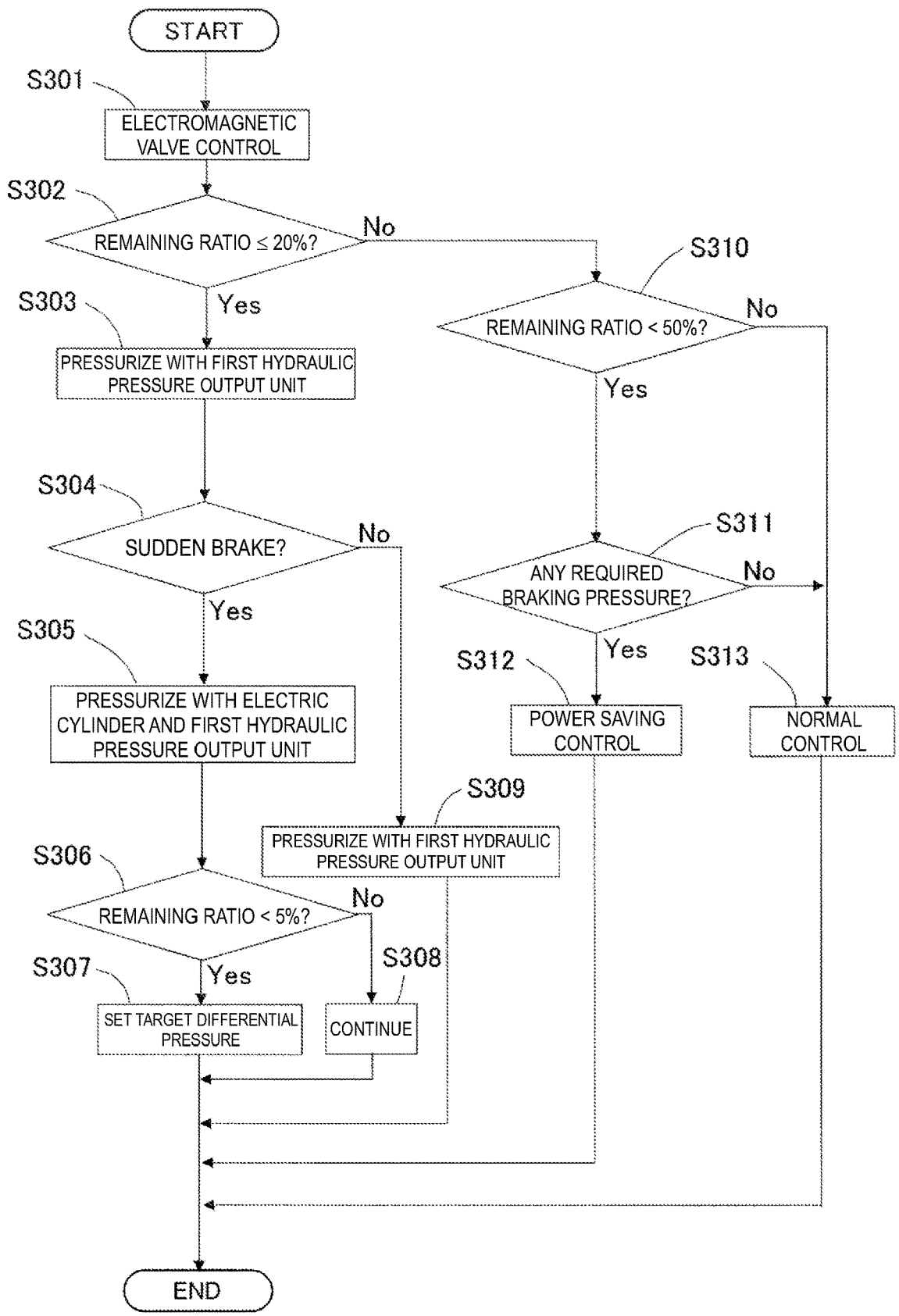
FIG. 6 is a flowchart showing a control example according to the first embodiment.

The second liquid leakage control (S107) will be described with reference to FIG. 6. The control unit 91 closes the communication control valve 61 and the master cut valve 62 (S301). The control unit 91 determines whether or not the piston 23 is located within a predetermined range, that is, whether or not the remaining ratio of the output chamber 24 is less than or equal to 20% (S302). When the remaining ratio of the output chamber 24 is less than or equal to 20% (S302: Yes), the control unit 91 pressurizes the first wheel cylinders 81 and 82 by the first hydraulic pressure output unit 31 while maintaining the output hydraulic pressure of the electric cylinder 2 (S303).

When sudden brake occurs (S304: Yes), the control unit 91 executes pressurization control by the electric cylinder 2 and the first hydraulic pressure output unit 31 (S305). Next, the control unit 91 determines whether or not the remaining ratio of the output chamber 24 is less than or equal to 5% (S306). When the remaining ratio of the output chamber 24 is less than or equal to 5% (S306: Yes), the target differential pressure of the differential pressure control valve 312 is set to a target pressure corresponding to a case where the hydraulic pressure output by the electric cylinder 2 is 0 (S307). When the electric cylinder 2 is bottomed and the pumps 315 and 325 are operated, the output hydraulic pressure of the electric cylinder 2 becomes 0. The pressure can be maintained so that the wheel pressure does not reduce by setting the target differential pressure of the differential pressure control valve 312 in this manner (increasing the target differential pressure with the output hydraulic pressure of the electric cylinder 2 set to 0). When the remaining ratio of the output chamber 24 is larger than 5% (S306: No), the control is executed as set in step S305 (S308). When sudden brake does not occur (S304: No), the control unit 91 continues to execute the pressurization control by the first hydraulic pressure output unit 31 (S309).

When the remaining ratio of the output chamber 24 is larger than 20% (S302: Yes), the control unit 91 determines whether or not the remaining ratio of the output chamber 24 is less than 50% (S310). When the remaining ratio of the output chamber 24 is less than 50% (S310: Yes), the control unit 91 determines whether or not the output hydraulic pressure of the electric cylinder 2 (detection value of the pressure sensor 73) is greater than or equal to the required braking pressure (S311). The required braking pressure is a braking force required to achieve the target deceleration. When the output hydraulic pressure of the electric cylinder 2 is larger than or equal to the required braking pressure (S311: Yes), the control unit 91 executes the power saving control and maintains the position of the piston 23 of the electric cylinder 2 (S312). As a result, the pressurization control by the electric cylinder can be continued.

When the remaining ratio of the output chamber 24 is greater than or equal to 50% (S310: No) or when the output hydraulic pressure of the electric cylinder 2 is less than the required braking pressure (S311: No), the control unit 91 executes the normal control (S313). The volume of the output chamber 24 is designed to be able to pressurize the four wheel cylinders 81 to 84. Therefore, if the remaining ratio of the output chamber 24 is larger than or equal to 50%, the two wheel cylinders of at least one system can be pressurized only by the electric cylinder 2. Therefore, if the remaining ratio of the output chamber 24 is larger than or equal to 50%, the wheel cylinders 81 and 82 of the rear wheels can be sufficiently pressurized by the electric cylinder 2.

(Control Example Other than at Time of Occurrence of Liquid Leakage)

Figure 7:
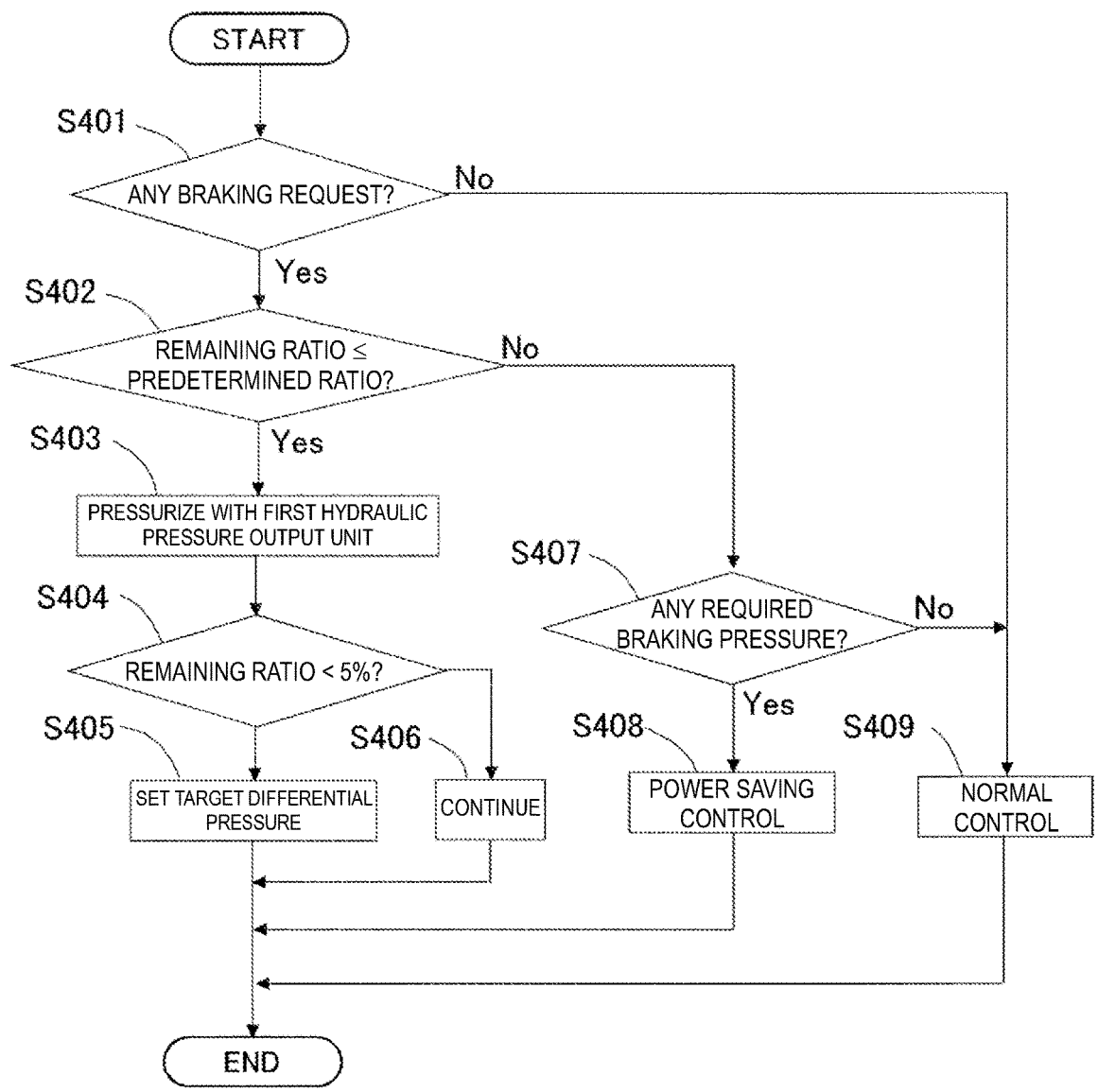
FIG. 7 is a flowchart showing a control example according to the first embodiment.

A control example other than at the time of occurrence of liquid leakage will be described with reference to FIG. 7. When the braking request by the brake operation or the braking request by the automatic brake is made (S401: Yes), the control unit 91 determines whether or not the remaining ratio of the output chamber 24 is less than or equal to a predetermined ratio (S402). When the remaining ratio of the output chamber 24 is less than or equal to a predetermined ratio (S402: Yes), the control unit 91 pressurizes the wheel cylinders 81 to 84 by the actuator 3 while maintaining the output hydraulic pressure of the electric cylinder 2 (S403). Next, the control unit 91 determines whether or not the remaining ratio of the output chamber 24 is less than or equal to 5% (S404). When the remaining ratio of the output chamber 24 is less than or equal to 5% (S404: Yes), the target differential pressure of the differential pressure control valve 312 is set to a target pressure corresponding to a case where the hydraulic pressure output by the electric cylinder 2 is 0 (S405). The pressure can be maintained so that the wheel pressure does not reduce by setting the target differential pressure of the differential pressure control valve 312 in this manner. When the remaining ratio of the output chamber 24 is larger than 5% (S404: No), the control is executed as set in step S403 (S406).

When the remaining ratio of the output chamber 24 is larger than the predetermined ratio (S402: No) and the output hydraulic pressure of the electric cylinder 2 is larger than or equal to the required braking pressure (S407: Yes), the control unit 91 executes the power saving control (S408). On the other hand, when the output hydraulic pressure of the electric cylinder 2 is less than the required braking pressure (S407: No), the control unit 91 executes the normal control (S409).

(Others)

The present disclosure is not limited to the embodiment described above. For example, the control of selecting the drive target according to the position of the piston 23 may be executed at least one of the normal time and the time of occurrence of liquid leakage. Each unit 91 to 95 of the first brake ECU 901 may be provided in at least one of the first brake ECU 901 and the second brake ECU 902. For example, the second brake ECU 902 can control the upstream unit 11 by instructing the first brake ECU 901. In addition, the simulator cut valve 44 may not be provided. A control example in a case where the simulator cut valve 44 is not provided will be described in a second embodiment.

Second Embodiment

Figure 8:
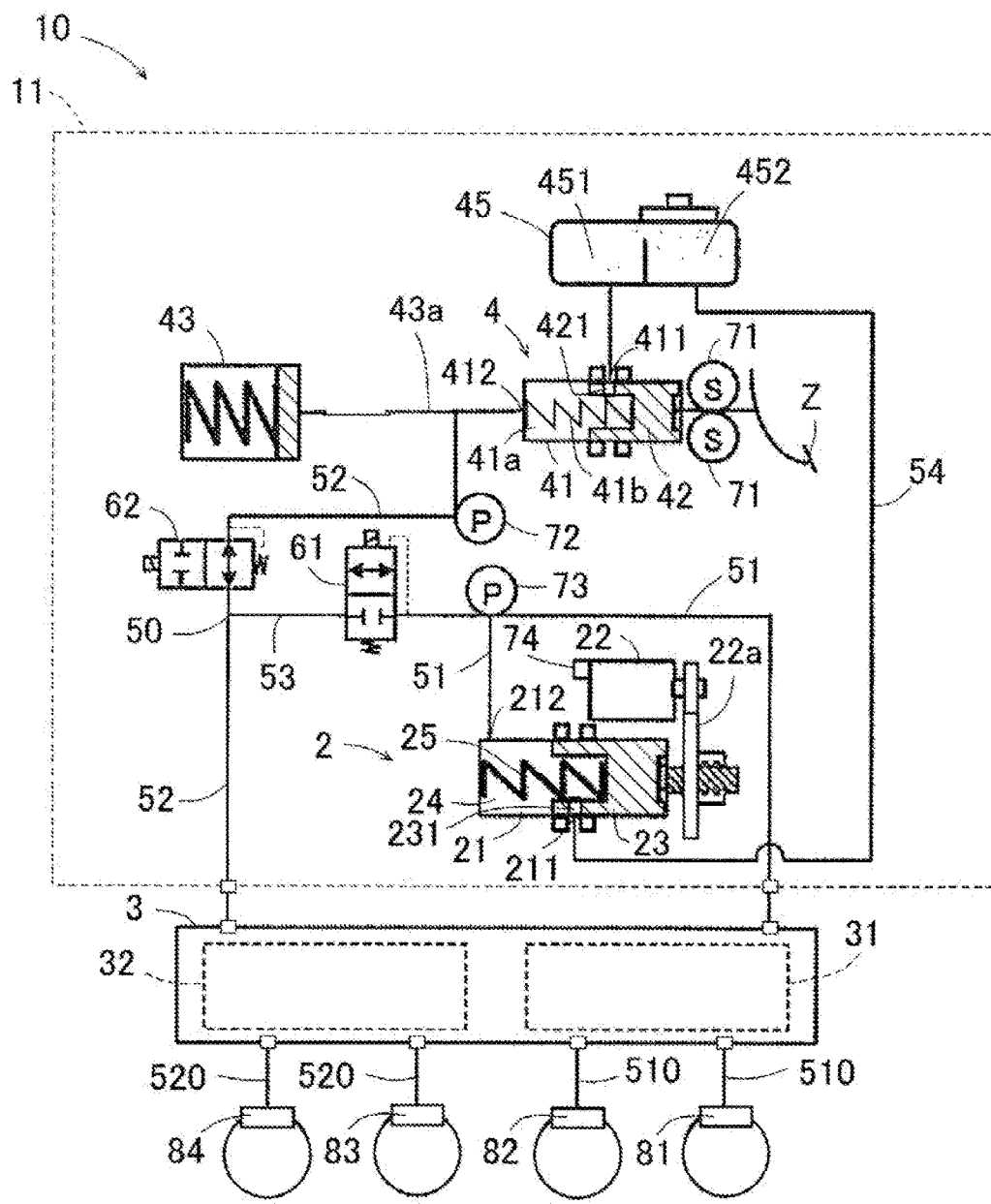
FIG. 8 is a configuration view of a vehicle braking device according to a second embodiment.
Figure 8:
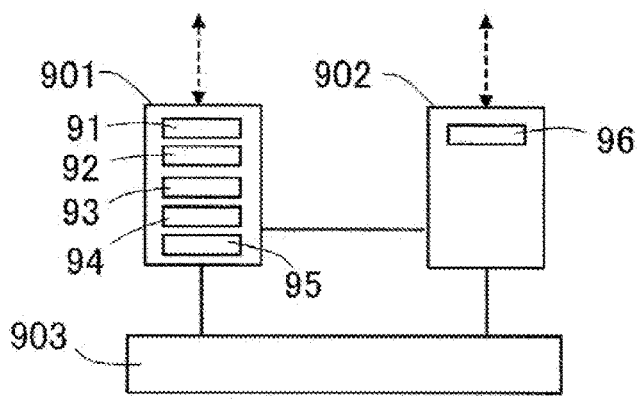

As illustrated in FIG. 8, a vehicle braking device 10 of a second embodiment is different from the vehicle braking device 1 of the first embodiment mainly in that the simulator cut valve 44 is not provided and the second brake ECU 902 includes the correction unit 96. Therefore, different portions will be explained. In the description of the second embodiment, the descriptions and the drawings of the first embodiment can be appropriately referred to.

Since the simulator cut valve 44 is not provided in the vehicle braking device 10, the master chamber 41*a* and the stroke simulator 43 always communicate with each other. Therefore, at the time of failure (e.g., when liquid leakage occurs in the first liquid passage 51), if the master cut valve 62 is opened and the communication control valve 61 is closed, the fluid is supplied from the master cylinder 4 not only to the second hydraulic pressure output unit 32 but also to the stroke simulator 43. As a result, the amount of fluid required to increase the master pressure becomes large compared to a case where the simulator cut valve 44 cuts off the liquid passage 43*a*. That is, the stroke of the brake operation member Z necessary for changing the braking force (wheel pressure, master pressure) increases. The driver easily feels that the braking force is not applied with respect to the stroke.

Similarly to the first embodiment, when the liquid leakage determination unit 93 determines that liquid leakage has occurred in the first liquid passage 51, the control unit 91 closes the communication control valve 61 and opens the master cut valve 62. Then, the control unit 91 uses the master pressure as the base hydraulic pressure to pressurize the second wheel cylinders 83 and 84 by the second hydraulic pressure output unit 32. That is, the control unit 91 executes the first liquid leakage control.

The second brake ECU 902 (and/or the first brake ECU 901) includes the correction unit 96 that corrects the target braking force. The target braking force is set by the operation amount (stroke and/or depression force) of the brake operation member Z. In the first liquid leakage control, the correction unit 96 corrects the target braking force to the increasing side at the time of pressurization. That is, the correction unit 96 increases the target braking force, that is, the target wheel pressure by the pressurization control. As a result, in the vehicle braking device 10 in which the simulator cut valve 44 is not provided, the responsiveness of the braking force of the first liquid leakage control improves.

Specific examples will be described below. In the description, the target wheel pressure before correction, that is, the original target wheel pressure is simply referred to as "target wheel pressure", the target wheel pressure after correction is referred to as "corrected target wheel pressure", and the actual wheel pressure is referred to as "actual wheel pressure". The correction unit 96 sets, as a target value, a corrected target wheel pressure (target wheel pressure<corrected target wheel pressure) obtained by multiplying the target wheel pressure by a gain until the ratio of the actual wheel pressure with respect to the target wheel pressure reaches a threshold ratio (e.g., 70%).

As the increase gradient of the target value increases, the increase gradient of the actual wheel pressure increases. The increase gradient of the actual wheel pressure can be adjusted by, for example, the rotation number of the electric motor 316 or the control current (target differential pressure) of the differential pressure control valve 322. The actual wheel pressure is calculated (estimated) based on the detection value of the pressure sensor 75 and the control state of the second hydraulic pressure output unit 32. Furthermore, when a pressure sensor is provided in the wheel cylinder, the actual wheel pressure can be acquired from the detection value.

After the ratio of the actual wheel pressure with respect to the target wheel pressure (hereinafter referred to as "target achievement ratio") reaches the threshold ratio, the correction unit 96 decreases the gain so that the actual wheel pressure converges to the target wheel pressure. This makes it possible to improve the responsiveness of the actual wheel pressure while suppressing the overshoot of the actual wheel pressure.

Even when the wheel pressure is reduced in the first liquid leakage control, the correction unit 96 sets the corrected target wheel pressure (target wheel pressure>corrected target wheel pressure), obtained by multiplying the target wheel pressure by a gain, as a target value until the target achievement ratio reaches the threshold ratio, similarly to the time of pressurization. That is, the correction unit 96 performs correction to reduce the target wheel pressure in the pressure reduction control. As a result, the decrease gradient of the target value increases, and the decrease gradient of the actual wheel pressure also increases. That is, similarly to the time of pressurization, the responsiveness of the braking force with respect to the brake operation improves. After the target achievement ratio reaches the threshold ratio, the gain is decreased so that the actual wheel pressure converges to the target wheel pressure. When detected that the brake operation direction is different before the target pressure is reached, the correction unit 96 cancels the correction. The brake operation direction may be detected based on a stroke sensor of the brake pedal. The cancellation of the correction may be determined based on the increase or decrease of the target deceleration instead of the brake steering direction. This makes it possible to improve the followability of the actual wheel pressure while suppressing the undershoot of the actual wheel pressure.

In the second embodiment, when the liquid leakage determination unit 93 determines that liquid leakage has occurred in the second liquid passage 52, the control unit 91 executes the second liquid leakage control similar to that in the first embodiment.

(Others)

The present disclosure is not limited to the first and second embodiments. For example, the actuator 3 may include an electric cylinder instead of the pump 315. The master cylinder 4 may be a tandem type master cylinder having two master chambers. In this case, one master chamber is connected to the first hydraulic pressure output unit 31, and the other master chamber is connected to the second hydraulic pressure output unit 32. The disclosure here can also be applied to, for example, a vehicle (hybrid vehicle or electric vehicle) including a regenerative braking device, a vehicle that executes automatic brake control, or an automatic driving vehicle. The vehicle braking device may be controlled by one brake ECU.

(Summary of Configuration)

A vehicle braking device 1, 10 includes: an electric cylinder 2 in which a piston 23 driven by an electric motor 22 slides in the cylinder 21 to supply fluid; a first hydraulic pressure output unit 31 connected to the electric cylinder 2 by way of a first liquid passage 51, the first hydraulic pressure output unit 31 pressurizing or depressurizing a hydraulic pressure in the first liquid passage 51 and outputting the hydraulic pressure to a supply liquid passage 510 connected to a first wheel cylinder 81, 82; and a control unit 91 that causes at least one of the electric cylinder 2 and the first hydraulic pressure output unit 31 to generate the hydraulic pressure in the first wheel cylinder 81, 82 according to a relative position between the piston 23 and the cylinder 21 (hereinafter simply referred to as "relative position").

When the piston 23 is located within a predetermined range that is a range including the bottoming position and not including the initial position, the control unit 91 pressurizes or depressurizes the first wheel cylinders 81 and 82 with the first hydraulic pressure output unit 31 while maintaining the relative position.

When the increase gradient of the target braking force is larger than or equal to a predetermined gradient, the control unit 91 pressurizes the first wheel cylinders 81, 82 with the electric cylinder 2 and the first hydraulic pressure output unit 31 regardless of the relative position.

In the pressurization control for pressurizing the first wheel cylinders 81 and 82, when the braking force applied to the vehicle is greater than or equal to the predetermined braking force, the control unit 91 maintains the relative position regardless of the relative position.

The vehicle braking device 1, 10 includes a second liquid passage 52 connected to the second wheel cylinders 83 and 84, a communication control valve 61 that is an electromagnetic valve provided in a communication path 53 connecting the first liquid passage 51 and the second liquid passage 52, and a liquid leakage determination unit 93 that determines whether or not liquid leakage has occurred in the second liquid passage 52. When the liquid leakage determination unit 93 determines that liquid leakage has not occurred, the control unit 91 causes fluid to be supplied from the electric cylinder 2 to the second wheel cylinders 83 and 84 through the communication control valve 61 in a state where the communication control valve 61 is opened, and when the liquid leakage determination unit 93 determines that liquid leakage has occurred in the second liquid passage 52, the control unit closes the communication control valve 61, and causes at least one of the electric cylinder 2 and the first hydraulic pressure output unit 31 to generate hydraulic pressure in the first wheel cylinders 81 and 82 according to a relative position of when determined that liquid leakage has occurred.

When determining whether or not liquid leakage has occurred, the liquid leakage determination unit 93 sets the moving speed of the piston 23 to be lower than the normal moving speed set based on the difference between the target pressure and the actual pressure in the first wheel cylinders 81 and 82.

The first hydraulic pressure output unit 31 includes a pump (corresponding to a "fluid supply source") 315 that supplies fluid to the main liquid passage 311 connecting the first liquid passage 51 and the first wheel cylinders 81 and 82, and a differential pressure control valve 312 that is an electromagnetic valve provided between a portion X of the main liquid passage 311 to which fluid is supplied by the pump 315 and the first liquid passage 51. When determining whether or not liquid leakage has occurred, the liquid leakage determination unit 93 closes the differential pressure control valve 312.

The vehicle braking device 1, 10 includes a position acquisition unit 94 that acquires a relative position and a hydraulic pressure acquisition unit 95 that acquires an output hydraulic pressure of the electric cylinder 2. The liquid leakage determination unit 93 determines whether or not liquid leakage has occurred based on the position of the piston 23 acquired by the position acquisition unit 94 and the output hydraulic pressure acquired by the hydraulic pressure acquisition unit 95.

The vehicle braking device 1 includes a master cylinder 4 connected to the second wheel cylinders 83 and 84 by way of a second liquid passage 52, a stroke simulator (corresponding to a "simulator") 43 connected to the master cylinder 4 by way of a simulator cut valve 44 that is an electromagnetic valve, and a master cut valve 62 that is an electromagnetic valve provided on the master cylinder 4 side of a connecting portion 50 between the second liquid passage 52 and the communication path 53 in the second liquid passage 52. The control unit 91 normally causes the electric cylinder 2 to generate the hydraulic pressure in a state where the master cut valve 62 is closed, and in a case where the liquid leakage determination unit 93 determines that the liquid leakage has occurred in the second liquid passage 52, causes at least one of the electric cylinder 2 and the first hydraulic pressure output unit 31 to generate the hydraulic pressure in the first wheel cylinders 81 and 82 in a state where the master cut valve 62 is closed and the simulator cut valve 44 is opened.

The invention claimed is:

1. A braking device for a vehicle comprising:
    an electric cylinder in which a piston driven by an electric motor slides in a cylinder to supply fluid;
    a hydraulic pressure output unit connected to the electric cylinder by way of a first liquid passage, the hydraulic pressure output unit pressurizing or depressurizing a hydraulic pressure in the first liquid passage and outputting the hydraulic pressure to a supply liquid passage connected to a first wheel cylinder; and
    a control unit that causes at least one of the electric cylinder and the hydraulic pressure output unit to generate the hydraulic pressure in the first wheel cylinder according to a relative position between the piston and the cylinder,
    wherein when the piston is located within a predetermined range that is a range including a bottoming position and not including an initial position, the control unit pressurizes or depressurizes the first wheel cylinder with the hydraulic pressure output unit while maintaining the relative position.

2. The braking device for the vehicle according to claim 1, wherein when an increase gradient of a target braking force is larger than or equal to a predetermined gradient, the control unit pressurizes the first wheel cylinder with the electric cylinder and the hydraulic pressure output unit regardless of the relative position.

3. The braking device for the vehicle according to claim 1, wherein in a pressurization control for pressurizing the first wheel cylinder, when a braking force applied to the vehicle is greater than or equal to a predetermined braking force, the control unit maintains the relative position regardless of the relative position.

4. The braking device for the vehicle according to claim 3, further comprising:
    a second liquid passage connected to a second wheel cylinder;
    a communication control valve that is an electromagnetic valve provided in a communication path connecting the first liquid passage and the second liquid passage; and a liquid leakage determination unit that determines whether or not liquid leakage has occurred in the second liquid passage, wherein the control unit when the liquid leakage determination unit determines that the liquid leakage has not occurred, causes fluid to be supplied from the electric cylinder to the second wheel cylinder through the communication control valve in a state where the communication control valve is opened, and when the liquid leakage determination unit determines that the liquid leakage has occurred in the second liquid passage, closes the communication control valve and causes at least one of the electric cylinder and the hydraulic pressure output unit to generate a hydraulic pressure in the first wheel cylinder according to the relative position when determined that the liquid leakage has occurred.

5. The braking device for the vehicle according to claim 4, wherein when determining whether or not the liquid leakage has occurred, the liquid leakage determination unit sets a moving speed of the piston to be lower than a normal moving speed set based on a difference between a target pressure and an actual pressure in the first wheel cylinder.

6. The braking device for the vehicle according to claim 5, wherein the hydraulic pressure output unit includes a fluid supply source that supplies fluid to a main liquid passage connecting the first liquid passage and the first wheel cylinder, and a differential pressure control valve that is an electromagnetic valve provided between a portion of the main liquid passage to which fluid is supplied by the fluid supply source and the first liquid passage, and the liquid leakage determination unit closes the differential pressure control valve when determining whether or not the liquid leakage has occurred.

7. The braking device for the vehicle according to claim 6, further comprising:

a position acquisition unit that acquires the relative position; and a hydraulic pressure acquisition unit that acquires an output hydraulic pressure of the electric cylinder, wherein the liquid leakage determination unit determines whether or not the liquid leakage has occurred based on a position of the piston acquired by the position acquisition unit and the output hydraulic pressure acquired by the hydraulic pressure acquisition unit.

8. The braking device for the vehicle according to claim 7, further comprising:

a master cylinder connected to the second wheel cylinder through the second liquid passage;

a simulator connected to the master cylinder through a simulator cut valve that is an electromagnetic valve; and a master cut valve that is an electromagnetic valve provided on the master cylinder side of a connection portion between the second liquid passage and the communication path in the second liquid passage, wherein the control unit causes the electric cylinder to generate a hydraulic pressure in a state where the master cut valve is closed in a normal state, and when the liquid leakage determination unit determines that the liquid leakage has occurred in the second liquid passage, causes at least one of the electric cylinder and the hydraulic pressure output unit to generate the hydraulic pressure in the first wheel cylinder in a state where the master cut valve is closed and the simulator cut valve is opened.

9. The braking device for the vehicle according to claim 1, further comprising:

a second liquid passage connected to a second wheel cylinder;

a communication control valve that is an electromagnetic valve provided in a communication path connecting the first liquid passage and the second liquid passage; and a liquid leakage determination unit that determines whether or not liquid leakage has occurred in the second liquid passage, wherein the control unit when the liquid leakage determination unit determines that the liquid leakage has not occurred, causes fluid to be supplied from the electric cylinder to the second wheel cylinder through the communication control valve in a state where the communication control valve is opened, and when the liquid leakage determination unit determines that the liquid leakage has occurred in the second liquid passage, closes the communication control valve and causes at least one of the electric cylinder and the hydraulic pressure output unit to generate a hydraulic pressure in the first wheel cylinder according to the relative position when determined that the liquid leakage has occurred.

10. The braking device for the vehicle according to claim 2, further comprising:

a second liquid passage connected to a second wheel cylinder;

a communication control valve that is an electromagnetic valve provided in a communication path connecting the first liquid passage and the second liquid passage; and a liquid leakage determination unit that determines whether or not liquid leakage has occurred in the second liquid passage, wherein the control unit when the liquid leakage determination unit determines that the liquid leakage has not occurred, causes fluid to be supplied from the electric cylinder to the second wheel cylinder through the communication control valve in a state where the communication control valve is opened, and when the liquid leakage determination unit determines that the liquid leakage has occurred in the second liquid passage, closes the communication control valve and causes at least one of the electric cylinder and the hydraulic pressure output unit to generate a hydraulic pressure in the first wheel cylinder according to the relative position when determined that the liquid leakage has occurred.

11. The braking device for the vehicle according to claim 4, further comprising:

a position acquisition unit that acquires the relative position; and a hydraulic pressure acquisition unit that acquires an output hydraulic pressure of the electric cylinder, wherein the liquid leakage determination unit determines whether or not the liquid leakage has occurred based on a position of the piston acquired by the position acquisition unit and the output hydraulic pressure acquired by the hydraulic pressure acquisition unit.

12. The braking device for the vehicle according to claim 4, further comprising:
- a master cylinder connected to the second wheel cylinder through the second liquid passage;
- a simulator connected to the master cylinder through a simulator cut valve that is an electromagnetic valve; and
- a master cut valve that is an electromagnetic valve provided on the master cylinder side of a connection portion between the second liquid passage and the communication path in the second liquid passage, wherein the control unit causes the electric cylinder to generate a hydraulic pressure in a state where the master cut valve is closed in a normal state, and when the liquid leakage determination unit determines that the liquid leakage has occurred in the second liquid passage, causes at least one of the electric cylinder and the hydraulic pressure output unit to generate the hydraulic pressure in the first wheel cylinder in a state where the master cut valve is closed and the simulator cut valve is opened.

\* \* \* \* \*